US011475862B2

(12) United States Patent
Frederick et al.

(10) Patent No.: US 11,475,862 B2
(45) Date of Patent: Oct. 18, 2022

(54) SELECTION OF AN EXTENDED DISPLAY IDENTIFICATION DATA STANDARD

(71) Applicant: HEWLETT-PACKARD DEVELOPMENT COMPANY, L.P., Spring, TX (US)

(72) Inventors: John W Frederick, Houston, TX (US); Tim Guynes, Houston, TX (US); Greg Staten, Houston, TX (US); Syed S Azam, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 72 days.

(21) Appl. No.: 16/482,299

(22) PCT Filed: Jul. 7, 2017

(86) PCT No.: PCT/US2017/041189
§ 371 (c)(1),
(2) Date: Jul. 31, 2019

(87) PCT Pub. No.: WO2019/009922
PCT Pub. Date: Jan. 10, 2019

(65) Prior Publication Data
US 2021/0327392 A1 Oct. 21, 2021

(51) Int. Cl.
*G09G 5/00* (2006.01)
(52) U.S. Cl.
CPC ..... *G09G 5/006* (2013.01); *G09G 2340/0435* (2013.01); *G09G 2340/0442* (2013.01); *G09G 2370/042* (2013.01); *G09G 2370/047* (2013.01)

(58) Field of Classification Search
None
See application file for complete search history.

(56) References Cited

U.S. PATENT DOCUMENTS

| 7,129,909 | B1* | 10/2006 | Dong | G09G 5/00 345/1.1 |
|---|---|---|---|---|
| 9,472,160 | B2 | 10/2016 | Choi | |
| 2006/0085627 | A1 | 4/2006 | Noorbakhsh et al. | |
| 2007/0222779 | A1* | 9/2007 | Fastert | G06T 1/00 345/418 |
| 2008/0151119 | A1* | 6/2008 | Suzuki | H04N 5/775 386/E5.07 |
| 2009/0027365 | A1 | 1/2009 | Choi | |

(Continued)

FOREIGN PATENT DOCUMENTS

| CN | 103489426 | 1/2014 |
|---|---|---|
| CN | 105957496 A | 9/2016 |

(Continued)

OTHER PUBLICATIONS

DSC DP-HD A Scaler • Setup Guide 2014, month unknown.

*Primary Examiner* — Joni Hsu
(74) *Attorney, Agent, or Firm* — Dicke Billig & Czaja PLLC

(57) ABSTRACT

One example of a device includes a display screen, a machine readable storage medium storing instructions and Extended Display Identification Data (EDID) data, and a processor. The processor is to execute the instructions to provide an on-screen display control to enable a user to select one of a plurality of EDID standards and format the EDID data based on the selected EDID standard.

9 Claims, 3 Drawing Sheets

(56) References Cited

U.S. PATENT DOCUMENTS

| | | | |
|---|---|---|---|
| 2009/0033668 A1* | 2/2009 | Pederson | G09G 5/006 345/520 |
| 2009/0058868 A1 | 3/2009 | Kang et al. | |
| 2009/0184962 A1* | 7/2009 | Kuriakose | G06F 3/14 345/428 |
| 2009/0307734 A1* | 12/2009 | Doi | G09G 5/006 725/105 |
| 2010/0060653 A1* | 3/2010 | Courtney, Jr. | G09G 5/18 345/530 |
| 2010/0268860 A1* | 10/2010 | Nikazm | G06F 3/00 710/105 |
| 2011/0072380 A1 | 3/2011 | Jang | |
| 2011/0279645 A1 | 11/2011 | Newton et al. | |
| 2011/0298795 A1* | 12/2011 | Van Der Heijden | H04N 13/327 345/419 |
| 2011/0304522 A1* | 12/2011 | Zeng | G09G 5/006 345/1.1 |
| 2017/0092226 A1* | 3/2017 | Park | H04N 5/765 |
| 2017/0132749 A1* | 5/2017 | Lim | H04L 65/80 |
| 2017/0347052 A1* | 11/2017 | Lin | G09G 5/006 |
| 2018/0226052 A1* | 8/2018 | LV | G09G 5/006 |

FOREIGN PATENT DOCUMENTS

| | | |
|---|---|---|
| EP | 2031578 | 3/2009 |
| JP | 1987-075810 | 4/1987 |
| KR | 10-0841434 | 6/2008 |
| KR | 20080085500 | 9/2008 |
| KR | 20090034108 | 4/2009 |

* cited by examiner

SELECTION OF AN EXTENDED DISPLAY IDENTIFICATION DATA STANDARD

BACKGROUND

Extended Display Identification Data (EDID) is a data structure provided by a display device to describe the capabilities of the display device to a video source (e.g., a graphics card, a set-top box, etc.). The EDID data defines the characteristics, features, and video timing modes for a display device. The EDID data enables a video source to know what display devices are connected to the video source. In one example, the EDID data is defined by standards published by the Video Electronics Standards Association (VESA) or by the Consumer Electronics Association (CEA).

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

There are currently several Extended Display Identification Data (EDID) standards being used in the display industry, e.g., Video Electronics Standards Association (VESA) E-EDID, VESA Display-ID, and Consumer Electronics Association (CEA). Each EDID standard has its advantages. However, it is not currently possible to support all of these EDID standards for each video input at the same time in a single display. This forces display manufacturers to select which EDID standard they believe will work best for their customers. As a result, some features of the display may not be available for customer use.

Accordingly, disclosed herein is a display device including an on-screen display (OSD) control to enable a user to select an EDID standard from a list of EDID standards for the display to use. Accordingly, the user can select the EDID standard that will work best for their use of the display. The OSD control may also enable the user to change the preferred mode (e.g., resolution and/or refresh rate) of the display and/or select the preset modes (e.g., lower resolutions) the user wants supported by the EDID.

As used herein, the term "EDID standard" includes any predefined specification setting forth the content and the format of EDID data stored in a display device to be transmitted to a video source in response to the display device being connected to the video source. An "EDID standard" may be specified by a standard setting body, such as VESA or CEA, or may be specified by a manufacturer or other party in the case of a custom or proprietary EDID specification.

Figure 1:
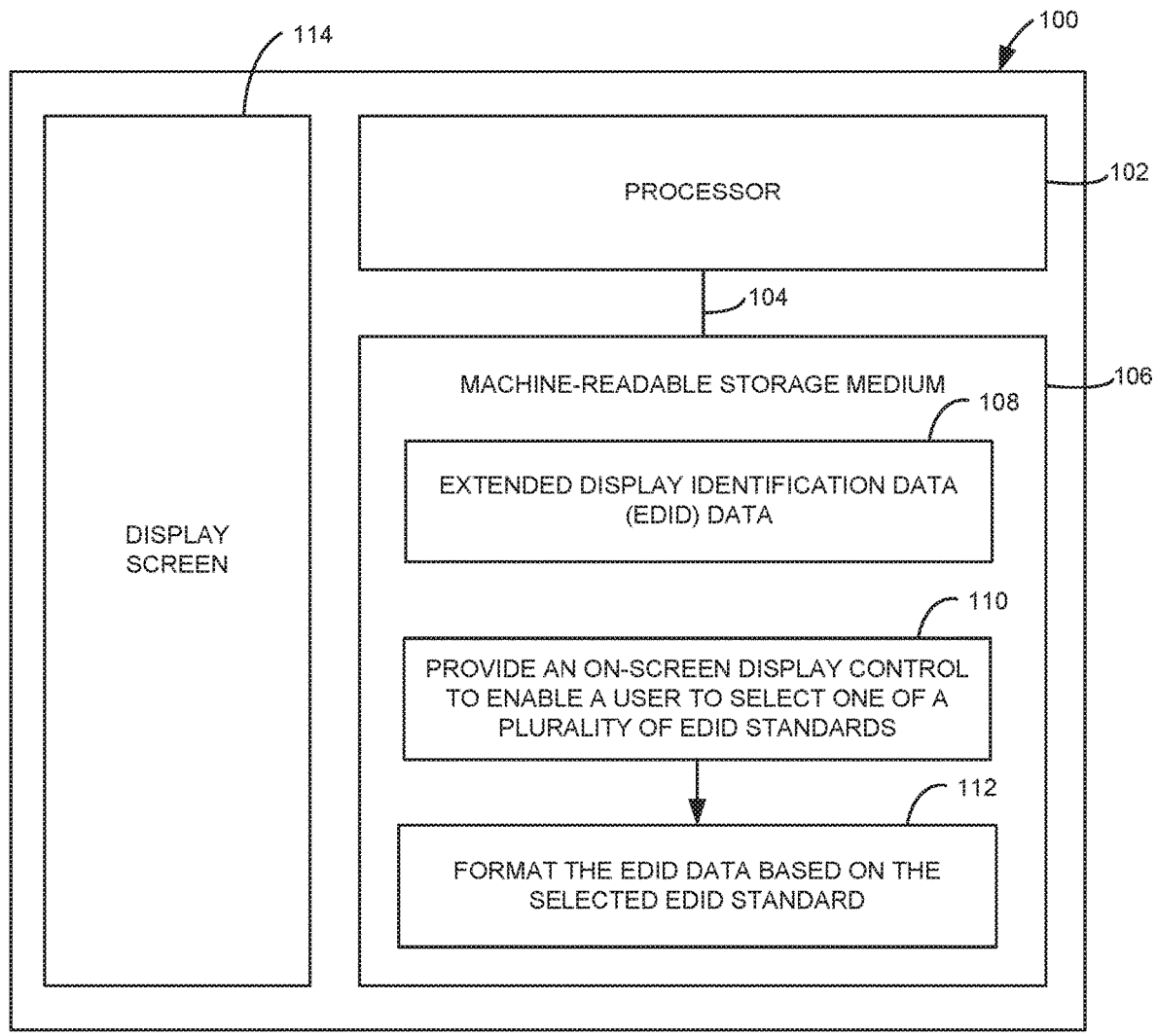
FIG. 1 is a block diagram illustrating one example of a display device enabling the selection of an Extended Display Identification Data (EDID) standard.

FIG. 1 is a block diagram illustrating one example of a display device 100 enabling the selection of an EDID standard. Display device 100 includes a processor 102, a machine-readable storage medium 106, and a display screen 114. Processor 102 is communicatively coupled to machine-readable storage medium 106 through a communication path 104. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 102 includes one or more central processing units (CPUs), microprocessors, and/or other suitable hardware devices for retrieval and modification of data stored in machine-readable storage medium 106 and for retrieval and execution of instructions stored in machine-readable storage medium 106. Machine-readable storage medium 106 may store data 108 including EDID data. The EDID data defines the characteristics, features, and video timing modes for display device 100. When display device 100 is connected to a video source, the EDID data is transmitted to the video source.

Processor 102 may fetch, decode, and execute instructions 110-112 to select an EDID standard for display device 100. Processor 102 may fetch, decode, and execute instructions 110 to provide an on-screen display control to enable a user to select one of a plurality of EDID standards. The on-screen display control is displayed on display screen 114. In one example, the on-screen display control enables the user to select one of a plurality of versions of the selected EDID standard. In another example, the on-screen display control enables the user to select a refresh rate to support in the EDID.

Processor 102 may fetch, decode, and execute instructions 112 to format the EDID data based on the selected EDID standard. The formatted EDID data may be stored in machine-readable storage medium 106 as EDID data 108. In one example, the plurality of EDID standards includes at least one of a VESA EDID standard. In another example, the plurality of EDID standards includes VESA E-EDID, VESA Display-ID, and CEA 861.

The VESA E-EDID standard defines a remotely readable (read by a source) data file stored in an electronic display. The data in the file identifies the characteristics, features, and video timing modes supported by the display product. The purpose of the standard is to describe the BASE (block 0) 128-byte data structure as well as the overall layout of the extended data blocks that make up complete EDID. The E-EDID standard specifies the elements, data structures, and file formats used to organize and store the EDID data. The contents of the data file are used by a video source to configure its graphics processing unit to generate correctly formatted video for the display and to provide additional information for certain application programs.

The VESA Display-ID standard defines flexible data formats that organize interface and display configuration information in a file stored in a display product. A video source has access to the file over the video interface connection. The video source uses this data to automatically setup and optimize the video interface and image signals facilitating plug and play operation with minimal or no user intervention.

The CEA 861 standard establishes protocols, requirements, and recommendations for the utilization of uncompressed digital interfaces by consumer electronics devices such as Digital Televisions (DTVs), digital cable, satellite or terrestrial set-top boxes (STBs), and related peripheral devices including, but not limited to DVD players/recorders, and other related Sources or Sinks. CEA 861 is applicable to a variety of standard DTV-related high-speed digital physical interfaces—such as Digital Visual Interface (DVI) 1.0, Open LVDS Display Interface (LDI), and High-Definition Multimedia Interface (HDMI) specifications. Protocols, requirements, and recommendations that are defined include Video Formats and waveforms; colorimetry and quantization; transport of compressed and uncompressed, as well as Linear Pulse Code Modulation (L-PCM), audio; carriage of auxiliary data; and implementations of the VESA E-EDID, which is used by Sinks to declare display capabilities and characteristics.

Accordingly, display device 100 allows the user to select the EDID standard (e.g., VESA E-EDID, VESA Display-ID, CEA) that will work best for their use of the display device. For example, if the user has a high resolution display, they may select the Display-ID standard that supports resolutions 4096 and higher. For a more widely supported EDID, the user may select the E-EDID standard.

Processor 102 may execute further instructions to add a new standard to the plurality of EDID standards in response to an update request. In one example, a new EDID standard may be installed in display device 100 using a Universal Serial Bus (USB) thumb drive. In another example, a new EDID standard may be installed in display device 100 by running an application on a video source (e.g., computer, set-top box) coupled to display device 100 that writes the new EDID standard to machine-readable storage medium 106 over Display Data Channel (DDC), USB, Ethernet, or DisplayPort Aux Channel. In yet another example, a new EDID standard could be created through options in the on-screen display control of display device 100.

A custom EDID standard may also be installed in display device 100 that describes unique features of the display device. For example, a custom EDID standard may describe color calibration functionality that is not possible to describe with current EDID standards. A new EDID standard may also include sensitive information that is encrypted. In this case, only authorized applications would be able to decrypt the EDID data.

As an alternative or in addition to retrieving and executing instructions, processor 102 may include electronic circuits comprising a number of electronic components for performing the functionality of the instructions in machine-readable storage medium 106. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 106 is a non-transitory storage medium and may be any suitable electronic, magnetic, optical, or other physical storage device that stores executable instructions. Thus, machine-readable storage medium 106 may be, for example, random access memory (RAM), an electrically-erasable programmable read-only memory (EEPROM), a storage drive, an optical disc, and the like. Machine-readable storage medium 106 may be disposed within display device 100, as illustrated in FIG. 1. In this case, the executable instructions may be installed on display device 100. Alternatively, machine-readable storage medium 106 may be a portable, external, or remote storage medium that allows display device 100 to download the instructions from the portable/external/remote storage medium. In this case, the executable instructions may be part of an installation package.

Figure 2:
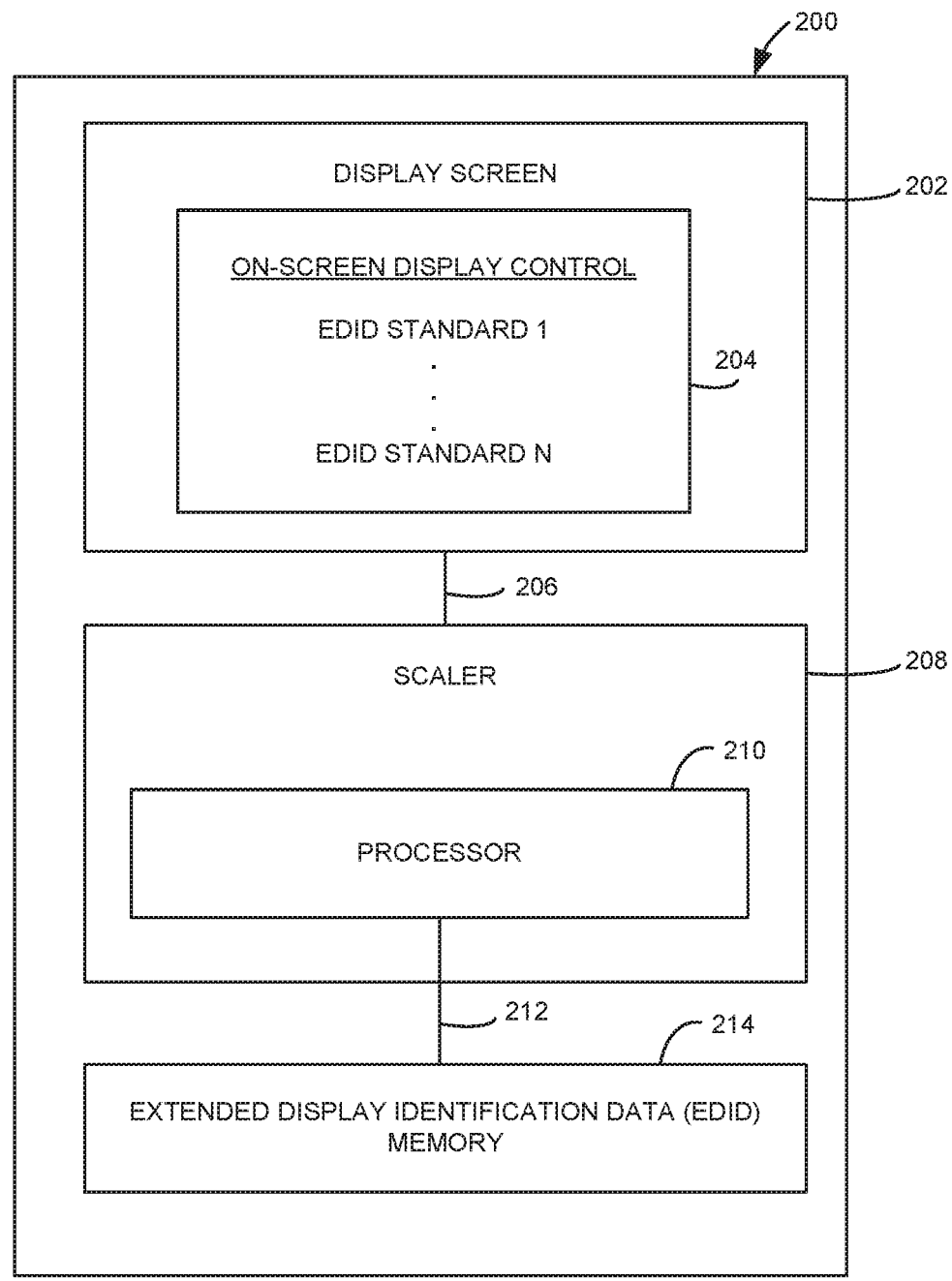
FIG. 2 is a block diagram illustrating another example of a display device enabling the selection of an EDID standard.

FIG. 2 is a block diagram illustrating another example of a display device 200 enabling the selection of an EDID standard. Display device 200 includes a display screen 202, a scaler 208, and an EDID memory 214. Display screen 202 is electrically coupled to scaler 208 through a communication path 206. Scaler 208 includes a processor 210, which is electrically coupled to EDID memory 214 through a communication path 212.

Scaler 208 converts received video signals of one display resolution to another display resolution for display on display screen 202. Scaler 208 may convert a signal from a lower resolution, such as 480p standard definition, to a higher resolution, such as 1080i high definition, which is known as upconversion or upscaling. Scaler 208 may also convert a signal from a higher resolution, such as 4 k ultra high definition, to a lower resolution, such as 1080p high definition, which is known as downconversion or downscaling.

EDID memory 214 stores EDID data for display device 200. The EDID data defines the characteristics, features, and video timing modes for display device 200. Processor 210 generates an on-screen display control 204 on display screen 202 listing a plurality of EDID standards 1 to N for selection by a user, where "N" is any suitable number of EDID standards. In one example, on-screen display control 204 also enables the user to select a resolution or a refresh rate to support in the EDID. Processor 210 reformats the EDID data stored in EDID memory 214 based on the selected EDID standard.

In one example, the plurality of EDID standards includes at least one of a VESA EDID standard. In another example, the plurality of EDID standards includes VESA E-EDID, VESA Display-ID, or CEA 861 as previously described with reference to FIG. 1. Processor 210 may also add an EDID standard to the plurality of EDID standards in response to an update request as previously described with reference to FIG. 1.

Figure 3:
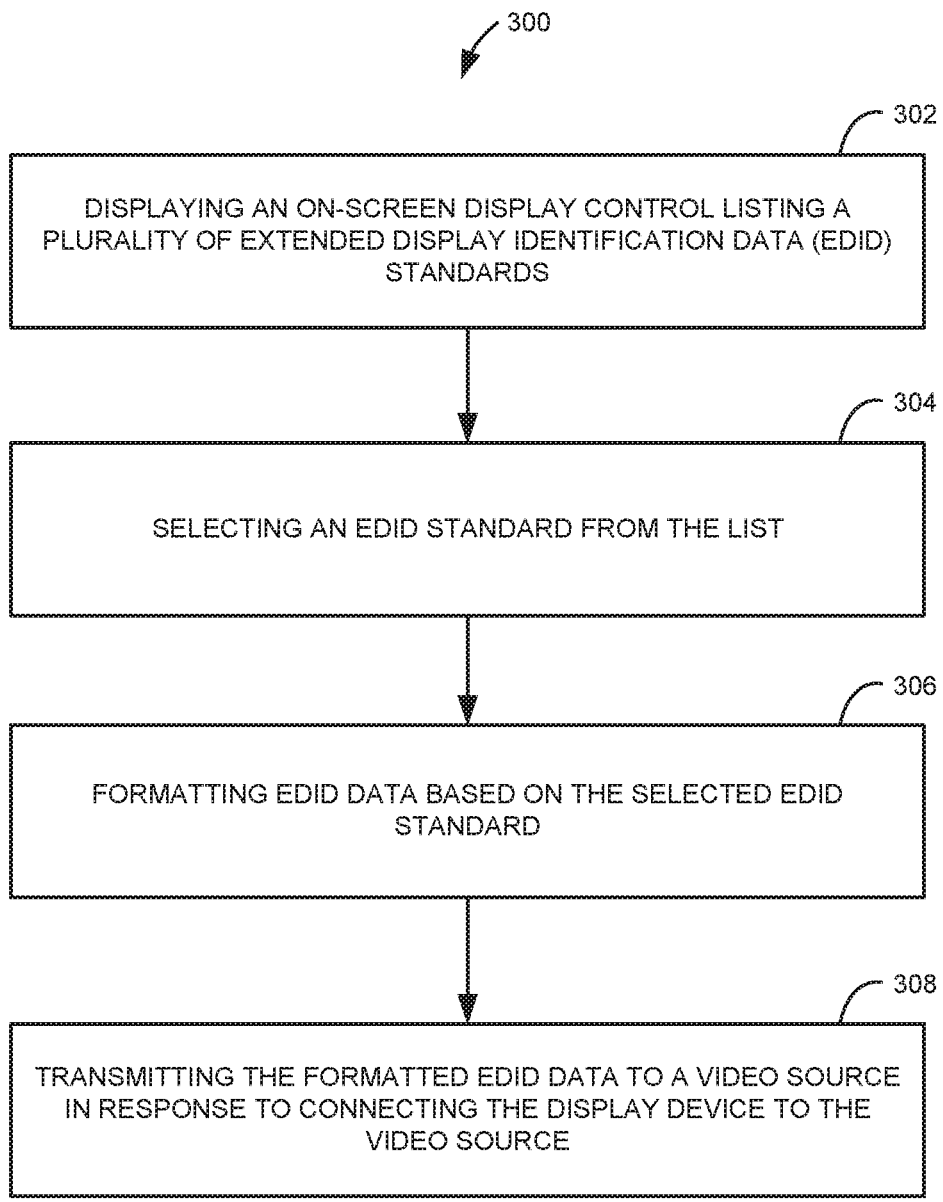
FIG. 3 is a flow diagram illustrating one example of a method for configuring a display device by selecting an EDID standard.

FIG. 3 is a flow diagram illustrating one example of a method 300 for configuring a display device by selecting an EDID standard. At 302, method 300 includes displaying an on-screen display control listing a plurality of EDID standards. In one example, the plurality of EDID standards includes at least one of a VESA EDID standard. At 304, method 300 includes selecting an EDID standard from the list. At 306, method 300 includes formatting EDID data based on the selected EDID standard. At 308, method 300 includes transmitting the formatted EDID data to a video source in response to connecting the display device to the video source.

In one example, method 300 also includes selecting an EDID version for the selected EDID standard and formatting the EDID data based on the selected version of the selected EDID standard. In another example, method 300 also includes adding a new EDID standard to the plurality of EDID standards. Further, the on-screen display control may list a plurality of refresh rates to support in the EDID, and method 300 may further include selecting a refresh rate from the list and modifying the EDID data to support the selected refresh rate.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A device comprising:
a display screen;
a machine readable storage medium storing instructions and Extended Display Identification Data (EDID) data; and
a processor to execute the instructions to:
provide an on-screen display control to enable a user to select one of a plurality of EDID standards stored in the machine readable storage medium;
format the EDID data based on the selected EDID standard; and
add a new standard to the plurality of EDID standards stored in the machine readable storage medium in response to an update request,
wherein the on-screen display control enables the user to select one of a plurality of versions of the selected EDID standard,
wherein the plurality of EDID standards includes Video Electronics Standards Association (VESA) E-EDID, VESA Display-ID, and Consumer Electronics Association (CEA) 861, and
wherein the processor executes the instructions to add the new standard to the machine-readable storage medium over a Display Data Channel (DDC), a Universal Serial Bus (USB), an Ethernet, or a DisplayPort Aux Channel.

2. The device of claim 1, wherein the on-screen display control enables the user to select a refresh rate to support in the EDID.

3. The device of claim 1, wherein the processor executes the instructions to create the new standard through options in the on-screen display control.

4. A device comprising:
a display screen;
an Extended Display Identification Data (EDID) memory storing EDID data; and
a video scaler including a processor, the processor to generate an on-screen display control listing a plurality of EDID standards for selection by a user and to reformat the EDID data stored in the EDID memory based on the selected EDID standard,
wherein the processor adds an EDID standard to the plurality of EDID standards in response to an update request,
wherein the on-screen display control enables the user to select one of a plurality of versions of the selected EDID standard,
wherein the plurality of EDID standards includes Video Electronics Standards Association (VESA) E-EDID, VESA Display-ID, and Consumer Electronics Association (CEA) 861, and
wherein the processor adds the EDID standard by writing the EDID standard to the EDID memory over a Display Data Channel (DDC), a Universal Serial Bus (USB), an Ethernet, or a DisplayPort Aux Channel.

5. The device of claim 4, wherein the on-screen display control enables the user to select a resolution or a refresh rate to support in the EDID.

6. The device of claim 4, wherein the processor adds the EDID standard by creating the EDID standard through options in the on-screen display control.

7. A method for configuring a display device, the method comprising:
displaying an on-screen display control listing a plurality of Extended Display Identification Data (EDID) standards and a plurality of refresh rates to support in the EDID;
selecting an EDID standard from the list;
formatting EDID data based on the selected EDID standard;
transmitting the formatted EDID data to a video source in response to connecting the display device to the video source;
adding a new EDID standard to the plurality of EDID standards;
selecting a refresh rate from the list;
modifying the EDID data to support the selected refresh rate; and
selecting an EDID version for the selected EDID standard,
wherein formatting the EDID data comprises formatting the EDID data based on the selected version of the selected EDID standard, and
wherein the plurality of EDID standards includes Video Electronics Standards Association (VESA) E-EDID, VESA Display-ID, and Consumer Electronics Association (CEA) 861.

8. The method of claim 7, wherein adding the new EDID standard comprises creating the new EDID standard through options in the on-screen display control.

9. The method of claim 7, wherein adding the new EDID standard comprises writing the new EDID standard to a memory of the display device over a Display Data Channel (DDC), a Universal Serial Bus (USB), an Ethernet, or a DisplayPort Aux Channel.

* * * * *